May 3, 1966 M. J. BERLYN Re. 26,016

FUEL INJECTION NOZZLE

Original Filed Feb. 4, 1963

INVENTOR.
MARTIN J. BERLYN
BY
Raymond A. Paquin
ATTORNEY.

United States Patent Office

Re. 26,016
Reissued May 3, 1966

26,016
FUEL INJECTION NOZZLE

Martin J. Berlyn, Beacon Lodge, Texas St., Morley, Leeds, England

Original No. 3,118,611, dated Jan. 21, 1964, Ser. No. 256,052, Feb. 4, 1963. Application for reissue Feb. 8, 1965, Ser. No. 448,904
13 Claims. (Cl. 239—533)

Matter enclosed in heavy brackets [ ] appears in the original patent but forms no part of this reissue specification; matter printed in italics indicates the additions made by reissue.

This invention relates to fuel injection nozzles for internal combustion engines and more particularly, to nozzles for diesel engines of the open-chamber direct-injection type.

In such engines, the use of spring-loaded differential-valve multiple-orifice nozzles is now almost universal. No other type of nozzle has provided such generally satisfactory solutions to the problems of formation, dispersion, and penetration of fuel spray in open chamber combustion spaces.

Contemporary nozzles for open-chamber diesel engines are excessively costly, but their major disadvantage is that they are objectionably bulky. It is to be understood that these shortcomings apply to the complete assembly of nozzle and nozzle-holder as a unit, not necessarily to the nozzle tip itself.

The designer of a diesel cylinder head must make best possible use of available space, but there is mutual conflict between space requirements of head structure, valves and porting for air and exhaust, adequate flow paths for cooling fluid, and studding for securing the head to the block.

Structural properties of materials and the natural laws of fluid flow and heat exchange govern all aspects of head design once the space for the injection nozzle assembly has been allocated.

Since the nozzle assembly must be located in or near the centre of the head, its size and shape prescribe the space available (between itself and the boundaries of the head) for all the other things included in the complete head design.

Compared with the very small nozzle tip, incorporating the fuel spray orifices, the nozzle-and-holder assembly is usually so large as to be a serious impediment to good cylinder head design.

Explanation of the relatively great size of the conventional nozzle assembly is to be found in the arrangement of the nozzle valve. The differential valve is always "inwardly opening". This is to say that it opens towards the incoming fuel. Since fuel under pressure from an injection pump flows through the nozzle towards the cylinder of the engine it follows that, with an "inwardly opening" nozzle valve, gas pressure from the engine cylinder acting through the nozzle orifices tends to hold the nozzle valve open, following injection, when it ought to close. The nozzle valve spring must therefore be capable of exerting the considerable force necessary to close the valve against cylinder pressure, and the appropriate spring is necessarily quite large.

Another shortcoming of many contemporary nozzle assemblies is that the body of the nozzle holder is axially compressed by the bolting employed for making a gas-tight seal between the holder and its seat in the cylinder head. The slight decrease in length of the holder body due to compressive deformation can disturb the nozzle valve spring setting. In order to restrict such maladjustment to the minimum, such nozzle holder bodies are made with a very substantial cross-section throughout that portion subjected to compression by the bolting load.

A further disadvantage of the conventional nozzle assembly is that it requires a "leak-off" tube to carry away fuel which has leaked to the atmospheric side of the lapped fit of the differential valve. The leak-off tubing of a multi-cylinder diesel engine is both expensive and irritating; it impairs accessibility and appearance. Because an engine will run without leak-off tubing, operators sometimes omit to replace it following a nozzle inspection so that in subsequent operation of the engine, small amounts of fuel may ooze down the side of the engine which then readily accumulates air-borne dirt; or the leak-off oil may accumulate in the bilges of a vessel where it is a fire hazzard; or it may find its way to the lubricating oil sump of the engine where it progressively dilutes the lubricating oil, with potentially calamitous results.

The injection nozzle assembly according to this invention is characterized by inherent compactness, by immunity from maladjustment due to deformation, and by elimination of leak-off and the concomitant plumbing.

An object of this invention is to provide a fuel injection nozzle assembly for diesel engines which is inherently and significantly more compact than contemporary nozzle assemblies for equivalent applications.

Another object is to provide a fuel injection nozzle assembly from which there is no fuel leak-off and which, consequently, requires no leak-off plumbing.

Another object is to provide a simple fuel injection nozzle assembly requiring no lapped fits and of relatively low manufacturing cost.

Another object is to provide a fuel injection nozzle assembly of unitary construction and of such low cost that it may be discarded and replaced at less than the cost of reconditioning a conventional nozzle assembly.

Referring to the drawings.

Figure 1:
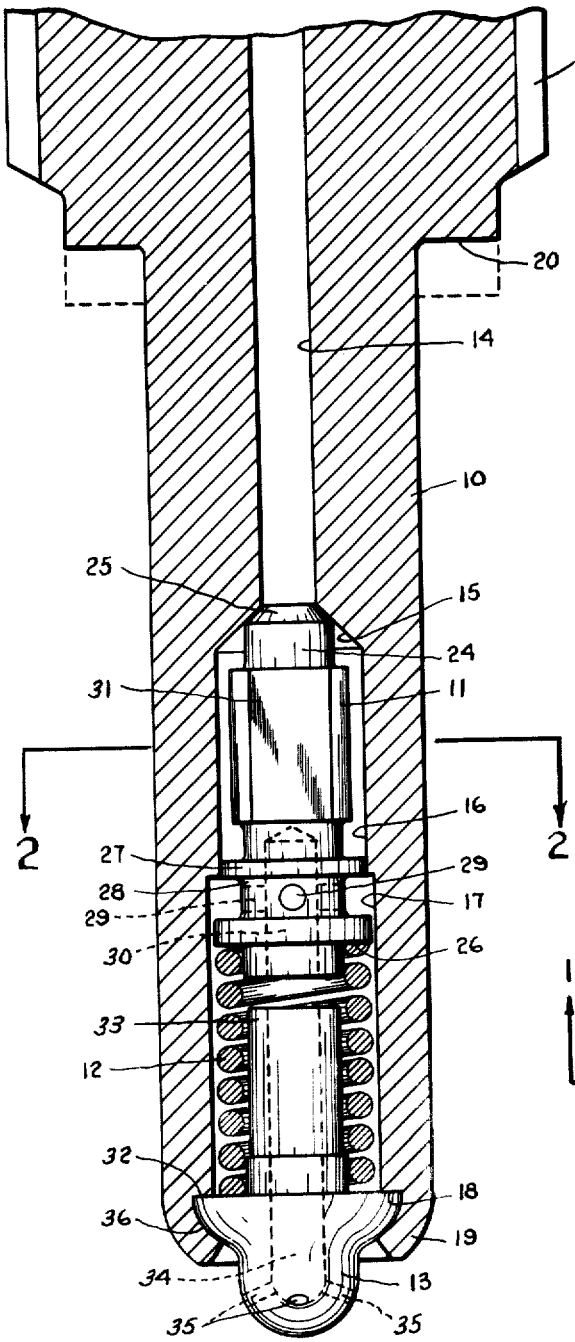
FIG. 1 is a fragmentary partial section of the assembly in the plane of the axis.
Figure 3:
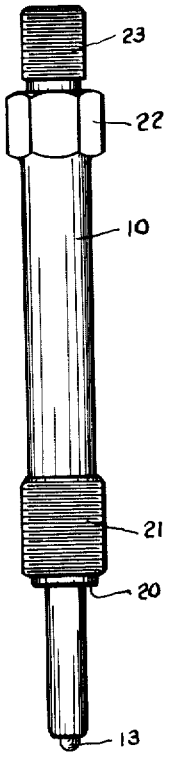
FIG. 3 is an elevation of a typical execution of the whole assembly to a smaller scale.
Figure 2:
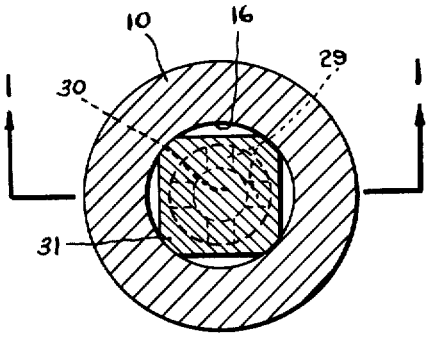
FIG. 2 is a transverse section as at 2—2 of FIG. 1.

With particular reference to FIG. 1, the assembly comprises four parts, nozzle holder 10, valve 11, spring 12 and nozzle 13.

Holder 10 is provided with central duct 14 for incoming fuel, valve seat 15, counterbore 16, spring chamber 17, nozzle seat 18 and deformable skirt 19 of reduced wall thickness. Holder 10 is also provided with gasket seat 20, installing thread 21, hexagon head 22 and union thread 23.

Valve 11 is provided with boss 24 having a tapered face 25 which cooperates with valve seat 15 to effect blocking of duct 14. The lower end of valve 11 is provided with spring seat 26 and retraction piston 27. Between spring seat 26 and retraction piston 27 is a neck 28 which is provided with radial ducts 29 intersecting axial duct 30. Between retraction piston 27 and boss 24 is a squared section 31.

Nozzle 13 is provided with spring seat 32, valve lift stop 33 and sac hole 34 which is intersected by nozzle orifices 35. The diameter of spring seat 32 is larger than the inside diameter of spring chamber 17 and abuts nozzle seat 18. Nozzle 13 is provided with a curved face 36 behind spring seat 31 and, after assembly of valve 11, spring 12 and nozzle 13 into holder 10, deformable skirt 19 is swaged or spun over curved face 36 of nozzle 13 to lock the assembly permanently together.

In nozzles for open-chamber direct-injection diesel engines of the high speed automotive type, to which this invention is specially applicable, the nozzle opening pressure is usually above 2,000 p.s.i., preferably between 2,500 p.s.i. and 3,500 p.s.i. With a differential nozzle valve of conventional type and proportions, the closing pressure is usually about 70% of the opening pressure. Peak injection pressure is generally between 6,000 p.s.i.g. and 8,500 p.s.i. Maximum gas pressure in the cylinder may be close to the nozzle closing pressure; if these two pressures are too close, malfunctioning results.

Valve 11 is of the so-called "outwardly opening" type; this is to say that it opens towards the engine cylinder and closes towards the fuel injection pump. Spring 12 urges valve 11 on to seat 15 (towards the pump). Gas pressure from the engine cylinder acts, by way of orifices 35, on valve 11 in the same direction as spring 12.

An important feature of outwardly opening nozzle valve 11 is that it is of the differential type and that it is so arranged that, when closed, the relatively large area of retraction piston 27, is subject to cylinder gas pressure in the closing direction while the relatively small area of boss 24 is exposed to fuel pressure in the opening direction.

In an engine functioning normally, of the total force holding valve 11 on seat 15 just before the beginning of injection, about 75% is due to gas pressure from the cylinder acting on retraction piston 27 and about 25% due to spring 12 acting on spring seat 26.

As soon as fuel pressure has lifted valve 11 from seat 15 the opening force on valve 11 increases greatly by the action of fuel pressure on the whole area defined by the diameter of retraction piston 27.

When retraction piston 27 emerges from counterbore 16, valve 11 tends to be in hydraulic balance, but the radial clearance between the periphery of retraction piston 27 and the inner wall of spring chamber 17 is small enough to provide mild throttling of the fuel flow; a pressure drop in the order of 200 p.s.i. across retraction piston 27 is all that is necessary to carry valve 11 into abutting contact with valve lift stop 33; therefore, the fuel pump may have to produce a pressure of 6,750 p.s.i. in order to provide an "injection pressure" of 6,500 p.s.i.

When the injection pump ends its pumping cycle and the pressure in duct 14 drops, the pressure in the engine cylinder is in the order of 1,000 p.s.i.; this pressure, acting on retraction piston 27 (and assisted by spring 12) provides a large closing force on valve 11.

As soon as retraction piston 27 enters counterbore 16, the effective volume of spring chamber 17 begins to increase, thus fuel is withdrawn from orifices 35 and no dribble takes place after injection.

From the foregoing, it will be seen that I have provided new and improved means for obtaining all of the objects and advantages of the invention.

I claim:

1. In a *fuel injection nozzle assembly for internal combustion engines* [device of the character described], a nozzle body having a duct for incoming fuel, a valve seat at the downstream extremity of said duct, a counterbore downstream of said valve seat, a spring chamber downstream of said counterbore, a nozzle seat downstream of said spring chamber and a deformable skirt downstream of said nozzle seat, a valve adapted to reciprocate in said counterbore, said valve having a face adapted to engage said valve seat in fluid sealing contact, said valve being provided with a piston downstream of said face, said piston being a reciprocable fluid sealing fit in said counterbore when said face is in contact with said valve seat, *said piston being subject to cylinder gas pressure in the closing direction when the injection pressure drops in said fuel duct,* said valve being provided with a spring seat downstream of said piston, said nozzle having a valve lift stop and having a perforated tip at its downstream extremity and a flange, and a spring engaging said spring seat of said valve and said flange of said nozzle, *whereby said spring will assist cylinder gas pressure in urging said valve face toward said valve seat, and whereby the effective volume of said spring chamber is increased and fuel is withdrawn which tends to eliminate fuel dribble after injection and said nozzle engaging said deformable skirt whereby the assembly is retained in permanent assembled relation by deformation of said deformable skirt with the connection of said deformable skirt and said nozzle being the sole fastening for holding the assembly permanently together.*

2. In a *fuel injection nozzle assembly for internal combustion engines* [device of the character described], a nozzle body having an axial duct for incoming fuel, a coaxial valve seat at the downstream extremity of said duct, a coaxial counterbore downstream of said valve seat, a coaxial spring chamber downstream of said counterbore, a coaxial nozzle seat downstream of said spring chamber and a coaxial deformable skirt downstream of said nozzle seat, a valve adapted to reciprocate in said counterbore, said valve having a face adapted to engage said valve seat in fluid sealing contact, said valve being provided with a piston downstream of said face, said piston being a reciprocable flud sealing fit in said counterbore when said face is in contact with said valve seat, *said piston being subject to cylinder gas pressure in the closing direction when the injection pressure drops in said fuel duct,* said valve being provided with a spring seat downstream of said piston, said nozzle having a valve lift stop and having a perforated tip at its downstream extremity and a flange, and a spring engaging said spring seat of said valve and said flange of said nozzle, *whereby said spring will assist cylinder gas pressure in urging said valve face toward said valve seat, and whereby the effective volume of said spring chamber is increased and fuel is withdrawn which tends to eliminate fuel dribble after injection and said nozzle engaging said deformable skirt whereby the assembly is retained in permanent assembled relation by deformation of said deformable skirt with the connection of said deformable skirt and said nozzle being the sole fastening for holding the assembly permanently together.*

3. In a *fuel injection nozzle assembly for internal combustion engines* [device of the character described], a nozzle body having an axial duct for incoming fuel, a coaxial valve seat at the downstream extremity of said duct, a coaxial counterbore downstream of said valve seat, a coaxial spring chamber downstream of said counterbore, a coaxial nozzle seat downstream of said spring chamber and a coaxial deformable skirt downstream of said nozzle seat, a valve adapted to reciprocate in said counterbore, said valve having a face adapted to engage said valve seat in fluid sealing contact, said valve being provided with a piston downstream of said face, said piston beng a reciprocable fluid sealing fit in said counterbore when said face is in contact with said valve seat, *said piston being subject to cylinder gas pressure in the closing direction when the injection pressure drops in said fuel duct,* said valve being provided with a spring seat downstream of said piston, said nozzle having a valve lift stop and having a perforated tip at its downstream extremity and a flange having a substantially flat upstream face, and a spring engaging said spring seat of said valve and said flange of said nozzle, *whereby said spring will assist cylinder gas pressure in urging said valve face toward said valve seat, and whereby the effective volume of said spring chamber is increased and fuel is withdrawn which tends to eliminate fuel dribble after injection and said nozzle engaging said deformable skirt whereby the assembly is retained in permanent assembled relation by deformation of said deformable skirt with the connection of said deformable skirt and said nozzle being the sole fastening for holding the assembly permanently together.*

4. In a device of the character described, a nozzle body having an axial duct for incoming fuel, a coaxial valve seat at the downstream extremity of said duct, a coaxial counterbore downstream of said valve seat, a coaxial spring chamber downstream of said counterbore, a coaxial nozzle seat downstream of said spring chamber and a coaxial deformable skirt downstream of said nozzle seat, a valve adapted to reciprocate in said counterbore, said valve having a face adapted to engage said valve seat in fluid sealing contact, said valve being provided with a piston downstream of said face, said piston being a reciprocable fluid sealing fit in said counterbore when said face is in contact with said valve seat, said valve being provided with a spring seat downstream of said piston, said nozzle having a hollow upstream extension forming a valve lift stop and having a perforated tip at its downstream extremity and a flange having a substantially flat upstream face and a substantially spherical downstream surface, and a spring engaging said spring seat of said valve and said flat face of said flange of said nozzle.

5. In a device of the character described, a nozzle body having an axial duct for incoming fuel, a coaxial valve seat of greater diameter than said duct at the downstream extremity of said duct, a coaxial counterbore of greater diameter than said duct downstream of said valve seat, a coaxial spring chamber of greater diameter than said counterbore downstream of said counterbore, a coaxial nozzle seat of greater diameter than said spring chamber downstream of said spring chamber and a coaxial deformable skirt downstream of said nozzle seat, a valve adapted to reciprocate in said counterbore, said valve having a face adapted to engage said valve seat in fluid sealing contact, said face being of smaller diameter than said counterbore, said valve being provided with a piston downstream of said face, said piston being a reciprocable fluid sealing fit in said counterbore when said face is in contact with said valve seat, said valve being provided with a spring seat downstream of said piston and of smaller diameter than said spring chamber, said nozzle having a hollow upstream extension forming a valve lift stop and having a perforated tip at its downstream extremity and a flange having a substantially flat upstream face and a substantially spherical downstream surface, and a spring engaging said spring seat of said valve and said flat face of said flange of said nozzle.

[6. In a device of the character described, a nozzle body having a duct for incoming fuel, a valve seat at the downstream extremity of said duct, a counterbore downstream of said valve seat, a spring chamber downstream of said counterbore, a nozzle seat downstream of said spring chamber, a valve adapted to reciprocate in said counterbore, said valve having a face adapted to engage said valve seat in fluid sealing contact, said valve being provided with a piston downstream of said face, said piston being a reciprocable fluid sealing fit in said counterbore when said face is in contact with said valve seat, said valve being provided with a spring seat downstream of said piston, said nozzle having a perforated tip at its downstream extremity and a flange, and a spring engaging said spring seat of said valve and said flange of said nozzle, and means for holding said flange against said nozzle seat.]

[7. In a device of the character described, a nozzle body having an axial duct for incoming fuel, a coaxial valve seat at the downstream extremity of said duct, a coaxial counterbore downstream of said valve seat, a coaxial spring chamber downstream of said counterbore, a coaxial nozzle seat downstream of said spring chamber, a valve adapted to reciprocate in said counterbore, said valve having a face adapted to engage said valve seat in fluid sealing contact, said valve being provided with a piston downstream of said face, said piston being a reciprocable fluid sealing fit in said counterbore when said face is in contact with said valve seat, said valve being provided with a spring seat downstream of said piston, said nozzle having a perforated tip at its downstream extremity and a flange, and a spring engaging said spring seat of said valve and said flange of said nozzle, and means for holding said flange against said nozzle seat.]

[8. In a device of the character described, a nozzle body having an axial duct for incoming fuel, a coaxial valve seat at the downstream extremity of said duct, a coaxial counterbore downstream of said valve seat, a coaxial spring chamber downstream of said counterbore, a coaxial nozzle seat downstream of said spring chamber, a valve adapted to reciprocate in said counterbore, said valve having a face adapted to engage said valve seat in fluid sealing contact, said valve being provided with a piston downstream of said face, said piston being a reciprocable fluid sealing fit in said counterbore when said face is in contact with said valve seat, said valve being provided with a spring seat downstream of said piston, said nozzle having a perforated tip at its downstream extremity and a flange having a substantially flat upstream face, and a spring engaging said spring seat of said valve and said flange of said nozzle, and means for holding said flange against said nozzle seat.]

[9. In a device of the character described, a nozzle body having an axial duct for incoming fuel, a coaxial valve seat at the downstream extremity of said duct, a coaxial counterbore downstream of said valve seat, a coaxial spring chamber downstream of said counterbore, a coaxial nozzle seat downstream of said spring chamber, a valve adapted to reciprocate in said counterbore, said valve having a face adapted to engage said valve seat in fluid sealing contact, said valve being provided with a piston downstream of said face, said piston being a reciprocable fluid sealing fit in said counterbore when said face is in contact with said valve seat, said valve being provided with a spring seat downstream of said piston, said nozzle having a perforated tip at its downstream extremity and a flange having a substantially flat upstream face and a substantially spherical downstream surface, and a spring engaging said spring seat of said valve and said flat face of said flange of said nozzle, and means for holding said flange against said nozzle seat.]

[10. In a device of the character described, a nozzle body having an axial duct for incoming fuel, a coaxial valve seat of greater diameter than said duct at the downstream extremity of said duct, a coaxial counterbore of greater diameter than said duct downstream of said valve seat, a coaxial spring chamber of greater diameter than said counterbore downstream of said counterbore, a coaxial nozzle seat of greater diameter than said spring chamber downstream of said spring chamber, a valve adapted to reciprocate in said counterbore, said valve having a face adapted to engage said valve seat in fluid sealing contact, said face being of smaller diameter than said counterbore, said valve being provided with a piston downstream of said face, said piston being a reciprocable fluid sealing fit in said counterbore when said face is in contact with said valve seat, said valve being provided with a spring seat downstream of said piston and of smaller diameter than said spring chamber, said nozzle having a perforated tip at its downstream extremity and a flange having a substantially flat upstream face and a substantially spherical downstream surface, and a spring engaging said spring seat of said valve and said flat face of said flange of said nozzle, and means for holding said flange against said nozzle seat.]

*11. In a device of the character described, a nozzle body having an axial duct for incoming fuel, a coaxial valve seat at the downstream extremity of said duct, a coaxial counterbore downstream of said valve seat, a coaxial spring chamber downstream of said counterbore, a coaxial nozzle seat downstream of said spring chamber and a coaxial deformable skirt downstream of said nozzle seat, a valve adapted to reciprocate in said counterbore, said valve having a face adapted to engage said valve seat in fluid sealing contact, said valve being provided with a piston downstream of said face, said piston being a reciprocable fluid throttling fit in said counterbore when said face is in contact with said valve seat, said valve being provided with a spring seat downstream of said piston, said nozzle having a hollow upstream extension forming a valve lift stop and having a perforated tip at its downstream extremity and a flange having a substantially flat upstream face and a substantially spherical downstream surface, and a spring engaging said spring seat of said valve and said flat face of said flange of said nozzle.*

*12. In a device of the character described, a nozzle body having an axial duct for incoming fuel, a coaxial*

*valve seat of greater diameter than said duct at the downstream extremity of said duct, a coaxial counterbore of greater diameter than said duct downstream of said valve seat, a coaxial spring chamber of greater diameter than said counterbore downstream of said counterbore, a coaxial nozzle seat of greater diameter than said spring chamber downstream of said spring chamber and a coaxial deformable skirt downstream of said nozzle seat, a valve adapted to reciprocate in said counterbore, said valve having a face adapted to engage said valve seat in fluid sealing contact, said face being of smaller diameter than said counterbore, said valve being provided with a piston downstream of said face, said piston being a reciprocable fluid throttling fit in said counterbore when said face is in contact with said valve seat, said valve being provided with a spring seat downstream of said piston and of smaller diameter than said spring chamber, said nozzle having a hollow upstream extension forming a valve lift stop and having a perforated tip at its downstream extremity and a flange having a substantially flat upstream face and a substantially spherical downstream surface, and a spring engaging said spring seat of said valve and said flat face of said flange of said nozzle.*

*13. In a relatively simple, compact and economical fuel injection nozzle assembly for internal combustion engines which requires no fuel leak-off, a nozzle body having fuel duct means for incoming fuel, said fuel duct means having a valve seat at the downstream extremity of said fuel duct, fuel passage means in said nozzle body downstream of and communicating with said duct means, said fuel passage means having a counterbore downstream of said valve seat and a spring chamber downstream of said counterbore, said nozzle body having deformable skirt means downstream of said nozzle seat, a nozzle downstream of said spring chamber, valve means mounted in said counterbore for reciprocation therein, said valve means having a face adapted to engage said valve seat of said fuel duct means in fluid sealing contact, said valve means having retraction piston means and a spring seat downstream of said face, said retraction piston means being in said counterbore when said valve face of said valve means is in engagement with said valve seat of said fuel duct means, said retraction piston means being subject to cylinder gas pressure in the closing direction when the injection fuel pressure drops in said fuel duct means, and spring means in said spring chamber and engaging said spring seat on said valve and said nozzle whereby said spring means will assist cylinder gas pressure in urging said valve face toward said valve seat, and whereby the effective volume of said spring chamber is increased and fuel is withdrawn which tends to eliminate fuel dribble after injection, said nozzle engaging said deformable skirt means whereby said assembly is retained in permanent assembled relation by deformation of said deformable skirt means.*

*14. In a relatively simple, compact and economical fuel injection nozzle assembly for internal combustion engines which requires no fuel leak-off, a nozzle body having fuel duct means for incoming fuel, said fuel duct means having a valve seat at the downstream extremity of said duct means, a fuel passage in said nozzle body communicating with said duct means, said fuel passage having a counterbore downstream of said valve seat and a spring chamber downstream of said counterbore, said nozzle body having a nozzle seat downstream of said spring chamber and deformable skirt means downstream of said nozzle seat, valve means mounted in said counterbore for reciprocation therein, said valve means having a face adapted to engage said valve seat in fluid sealing contact, said valve means having retraction piston means and a spring seat downstream of said face, said retraction piston means being in said counterbore when said valve face is in engagement with said valve seat, said retraction piston means being subject to cylinder gas pressure in the closing direction when said valve face is in engagement with said valve seat, and nozzle means engaging said deformable skirt means whereby said assembly is retained in permanent assembled relation by deformation of said deformable skirt means, and spring means engaging said spring seat on said valve and said nozzle whereby said spring means will assist cylinder gas pressure in urging said valve face toward said valve seat, and whereby the effective volume of said spring chamber is increased and fuel is withdrawn which tends to eliminate fuel dribble after injection.*

*15. In a relatively simple, compact and economical fuel injection nozzle assembly for internal combustion engines which requires no fuel leak-off, a nozzle body having fuel duct means for incoming fuel, said fuel duct means having a valve seat at the downstream extremity of said fuel duct means, fuel passage means in said nozzle body downstream of and communicating with said duct means, said fuel passage means having a counterbore downstream of said valve seat and a spring chamber downstream of said counterbore, said nozzle body having deformable skirt means downstream of said spring chamber, a nozzle downstream of said spring chamber and supported by deformation of said deformable skirt means of said nozzle body, valve means mounted in said counterbore for reciprocation therein, said valve means having a face adapted to engage said valve seat of said fuel duct means in fluid sealing contact, said valve means having retraction piston means and a spring seat downstream of said face, said retraction piston means being in said counterbore when said valve face of said valve means is in engagement with said valve seat of said fuel duct means, said retraction piston means being subject to cylinder gas pressure in the closing direction when the injection fuel pressure drops in said fuel duct means and spring means in said spring chamber and engaging said spring seat on said valve and said nozzle whereby said spring means will assist cylinder gas pressure in urging said valve face toward said valve seat, and whereby the effective volume of said spring chamber is incerased and fuel is withdrawn which tends to eliminate fuel dribble after injection, said nozzle being secured to said nozzle body engaging said deformable skirt means whereby said assembly is retained in permanent assembled relation by deformation of said deformable skirt means, said nozzle having a valve lift stop for limiting the movement of said valve means.*

*16. In a relatively simple, compact and economical fuel injection nozzle assembly for internal combustion engines which requires no fuel leak-off, a nozzle body having fuel duct means for incoming fuel, said fuel duct means having a valve seat at the downstream extremity of said duct means, a fuel passage in said nozzle body communicating with said duct means, said fuel passage having a counterbore downstream of said valve seat and a spring chamber downstream of said counterbore, said nozzle body having a nozzle seat downstream of said spring chamber and deformable skirt means downstream of said nozzle seat, valve means mounted in said counterbore for reciprocation therein, said valve means having a face adapted to engage said valve seat in fluid sealing contact, said valve means having retraction piston means and a spring seat downstream of said face, said retraction piston means being in said counterbore when said valve face is in engagement with said valve seat, said retraction piston means being subject to cylinder gas pressure in the closing direction when said valve face is in engagement with said valve seat, and nozzle means engaging said deformable skirt means whereby said assembly is retained in permanent assembled relation by deformation of said deformable skirt means, and spring means engaging said spring seat on said valve and said nozzle whereby said spring means will assist cylinder gas pressure in urging said valve face toward said valve seat, and whereby the effective volume of said spring chamber is increased and fuel is withdrawn which tends to eliminate fuel dribble after injection, said nozzle hav-*

*ing a valve lift stop for limiting the movement of said valve means.*

*17. In a relatively simple, compact and economical fuel injection nozzle assembly for internal combustion engines which requires no fuel leak-off, a nozzle body having fuel duct means for incoming fuel, said fuel duct means having a valve seat at the downstream extremity of said duct means, a fuel passage in said nozzle body communicating with said duct means, said fuel passage having a counterbore downstream of said valve seat and a spring chamber downstream of said counterbore, said nozzle body having a nozzle seat downstream of said spring chamber and deformable skirt means downstream of said nozzle seat, valve means mounted in said counterbore for reciprocation therein, said valve means having a face adapted to engage said valve seat in fluid sealing contact, said valve means having retraction piston means and a spring seat downstream of said face, said retraction piston means being in said counter bore when said valve face is in engagement with said valve seat, said retraction piston means being subject to cylinder gas pressure in the closing direction when said valve face is in engagement with said valve seat, and nozzle means engaging said deformable skirt means whereby said assembly is retained in permanent assembled relation by deformation of said deformable skirt means, and spring means engaging said spring seat on said valve and said nozzle whereby said spring means will assist cylinder gas pressure in urging said valve face toward said valve seat, and whereby the effective volume of said spring chamber is increased and fuel is withdrawn which tends to eliminate fuel dribble after injection, said spring seat being downstream of said retraction piston.*

*18. In a relatively simple, compact and economical fuel injection nozzle assembly for internal combustion engines which requires no fuel leak-off, a nozzle body having fuel duct means for incoming fuel, said duct means having a valve seat at the downstream extremity of said duct means, a fuel passage in said nozzle body communicating with said duct means, said fuel passage having a counterbore downstream of said valve seat and a spring chamber downstream of said counterbore, said nozzle body having a nozzle seat downstream of said spring chamber and deformable skirt means downstream of said nozzle seat, valve means mounted in said counterbore for reciprocation therein, said valve means having a face adapted to engage said valve seat in fluid sealing contact, said valve means having retraction piston means and a spring seat downstream of said face, said retraction piston means being in said counterbore when said valve face is in engagement with said valve seat, said retraction piston means being subject to cylinder gas pressure in the closing direction when said valve face is in engagement with said valve seat, and nozzle means engaging said deformable skirt means whereby said assembly is retained in permanent assembled relation by deformation of said deformable skirt means, and spring means engaging said spring seat on said valve and said nozzle whereby said spring means will assist cylinder gas pressure in urging said valve face toward said valve seat, and whereby the effective volume of said spring chamber is increased and fuel is withdrawn which tends to eliminate fuel dribble after injection, said nozzle having a perforated tip at its downstream extremity.*

References Cited by the Examiner

The following references, cited by the Examiner, are of record in the patented file of this patent or the original patent.

UNITED STATES PATENTS

| | | | |
|---|---|---|---|
| 2,387,690 | 10/1945 | Stelzel | 239—533 |
| 2,623,782 | 12/1952 | Gustafson | 239—533 |
| 2,623,783 | 12/1952 | Gustafson | 239—533 |
| 2,665,167 | 1/1954 | High | 239—533 |

FOREIGN PATENTS

| | | |
|---|---|---|
| 902,982 | 1/1945 | France. |
| 835,660 | 4/1952 | Germany. |
| 348,712 | 5/1931 | Great Britain. |

EVERETT W. KIRBY, *Primary Examiner.*